United States Patent [19]
Corderac'k

[11] 3,891,333
[45] June 24, 1975

[54] MOUNTING ASSEMBLY FOR BICYCLE SADDLE OR THE LIKE

[76] Inventor: Maurice Louis Paul Jean Corderac'k, 64, rue Alsace Lorraine, Bron, Rhone, France

[22] Filed: Jan. 17, 1974

[21] Appl. No.: 434,246

[30] Foreign Application Priority Data
Feb. 5, 1973 France .............................. 73/04557

[52] U.S. Cl. .................... 403/84; 248/49; 297/195; 297/313; 403/81; 403/121
[51] Int. Cl. ........................ F16c 11/00; F16l 27/00
[58] Field of Search .......... 297/313, 314, 316, 328, 297/326, 195, 337; 403/84, 81, 121; 174/148, 149, 162; 248/56, 157, 49, 274, 67.5, 65, 67.7, 276, 788

[56] References Cited
UNITED STATES PATENTS
| | | | |
|---|---|---|---|
| 703,891 | 7/1902 | Brooks et al. | 403/84 |
| 3,055,398 | 9/1962 | Tunnessen | 248/49 |

FOREIGN PATENTS OR APPLICATIONS
| | | | |
|---|---|---|---|
| 1,089,652 | 9/1960 | Germany | 403/84 |
| 677,677 | 8/1962 | United Kingdom | 403/84 |
| 495,582 | 9/1950 | Belgium | 403/84 |
| 21,095 | 11/1899 | United Kingdom | 297/313 |

*Primary Examiner*—James T. McCall
*Attorney, Agent, or Firm*—Karl F. Ross; Herbert Dubno

[57] ABSTRACT

A saddle for a bicycle, motorcycle, or the like has a pair of longitudinally extending parallel mounting rods which are held in a pair of seats in a mounting plate by means of a clamping member which overlies these rods. A pair of bolts spaced in front and in back of a boss formed either on the underside of the plate or on the upper surface of the support head of the bicycle engage the clamping member so that when one bolt is screwed in and the other out the plate and thus the saddle is rocked about a horizontal transverse axis. The securing member can be a pair of transversely extending tubes formed with crosswise treaded bores into which the bolt ends are threaded, or a plate with a pair of longitudinal grooves may overlie the first-mentioned plate to sandwich the mounting rods.

10 Claims, 6 Drawing Figures

PATENTED JUN 24 1975 3,891,333

SHEET 1

MOUNTING ASSEMBLY FOR BICYCLE SADDLE OR THE LIKE

FIELD OF THE INVENTION

The present invention relates to a mounting assembly for a saddle of a bicycle, motorcycle, or the like. More particularly this invention concerns such a mounting assembly used to secure a bicycle saddle having a pair of longitudinal mounting rods to a support head so that the seat may be tipped about a transverse axis.

BACKGROUND OF THE INVENTION

Each bicycle user usually has a preference as to the height and angle of the bicycle saddle. It is therefore known to secure the saddle so that it can rock on a rod or tube which can be slid longitudinally and clamped within a holding tube. The saddle is lifted to the desired level and clamped in place, then it is tilted to the desired inclination and again clamped.

As a general rule the saddle has a pair of mounting rods constituted as spring-steel rods forming part of a cushion mounting for the saddle. These rods extend longitudinally, that is parallel to the normal direction of travel of the bicycle, and are used to secure the saddle to a head on top of the support tube. The mechanism permitting the seat to be tilted about a transverse axis, parallel to the axes of rotation of the bicycle wheels, is often complicated and difficult to adjust.

OBJECTS OF THE INVENTION

It is therefore an object of the present invention to provide an improved mounting assembly for a saddle of a bicycle or the like.

Another object is the provision of such an assembly which allows the inclination of the saddle about a transverse axis to be readily adjusted.

A further object is to provide an extremely simple and robust mounting assembly for a bicycle saddle.

SUMMARY OF THE INVENTION

These objects are attained according to the present invention in a mounting assembly which has a mounting plate formed with a pair of longitudinally extending and transversely spaced seats which each receive one of the mounting rods. A clamping member overlies these rods and securing elements which are longitudinally spaced extend between the clamping member and the support head on the support tube. The face of the plate is formed with a boss bearing between the adjustment elements on the face of the support head, or vice versa so that when one of the adjustment or securing elements is shortened and the other is lengthened the plate is tilted on the support head.

According to another feature of this invention the adjustment elements are a pair of bolts each having one end in force-transmitting engagement with the plate and another end in force-transmitting engagement with the support. Thus the one bolt is screwed in and the other screwed out to tilt the saddle on the support.

In accordance with yet another feature of the invention the clamping member is another plate similar to the mounting plate and sandwiching the rods therewith, both plates being formed with registering longitudinally spaced and aligned holes for the bolts.

According to a further feature of the present invention the clamping member is formed of a pair of transverse tubes threaded onto the respective adjustment rods and each having a pair of transversely spaced circumferential grooves receiving the mounting rods of the saddle.

BRIEF DESCRIPTION OF THE DRAWING

The above and other objects, features, and advantages of the present invention will become more readily apparent from the following description, reference being made to the accompanying drawing in which.

SPECIFIC DESCRIPTION

Figure 1:
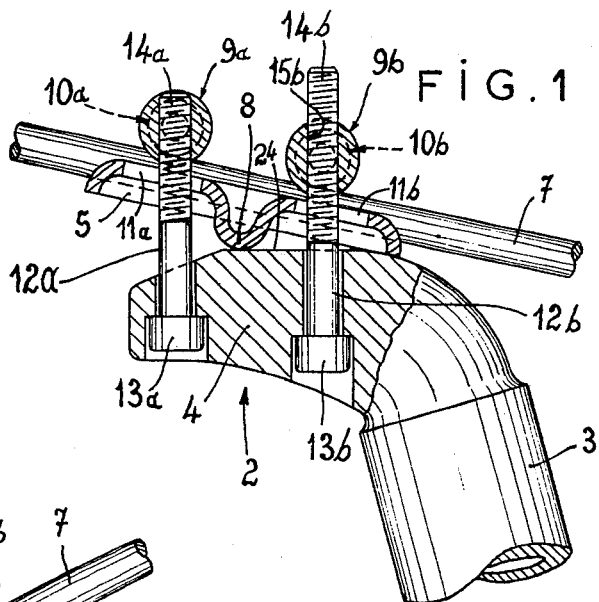
FIGS. 1 and 2 are longitudinal sections through a mounting assembly according to the present invention in two different positions.
Figure 2:
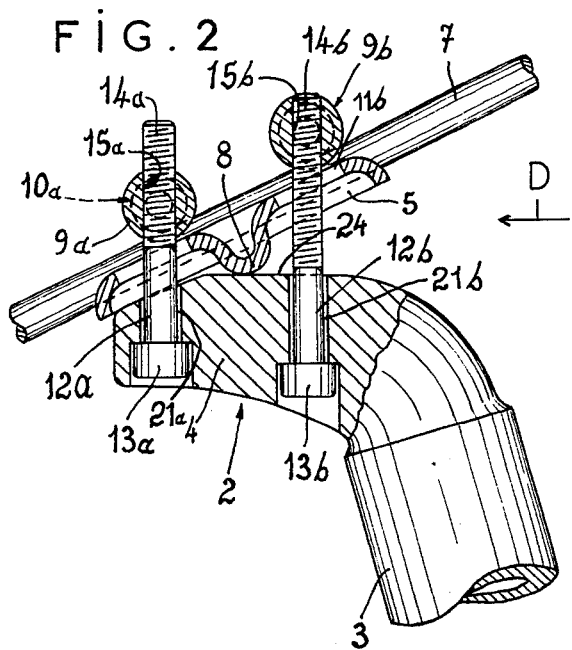
Figure 3:
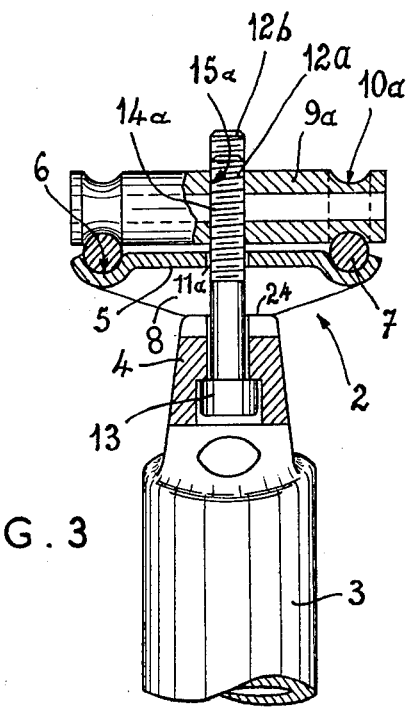
FIG. 3 is a transverse section through the assembly of FIGS. 1 and 2.

As shown in FIGS. 1–3 a bicycle has a support 2 formed by a tube 3 having a head 4 with a flat upper face 24 extending horizontally and generally in the longitudinal direction D of travel of the bicycle. The saddle has two longitudinally extending and transversely spaced mounting rods 7 which lie in parallel grooves 6 formed in a mounting plate 8 formed on its side toward the face 24 with a transverse ridge (of arcuate section) 8 that rests of this flat face 24 (see FIGS. 2 and 3).

A pair of clamping members 9a and 9b in the form of short tubes one each formed with a pair of respective circumferential grooves 10a and 10b which rest over the two mounting rods 7. Each tube 9a and 9b is formed centrally with a transverse throughgoing bore 15a, 15b in which is received the respective threaded end 14a, 14b of a respective bolt 9a, 9b. The heads 13a and 13b of these bolts 9a and 9b rest in counterbores 21a and 21b formed in the support head 4 and the shanks of these bolts pass through holes 11a and 11b in the plate 5. The bolts 12a and 12b are parallel and longitudinally in line to either side of the ridge or boss 8 so that they can rock or tilt the plate 5 about an axis transverse to direction D by screwing one of the bolts in and screwing the other out.

FIG. 1 shows how with the bolt 12a only screwed slightly into its clamping member 9a and the bolt 12b screwed further in, the rods 7 tilt down toward the back of the bicycle, whereas an opposite inclination is obtained in FIG. 2 by screwing the bolt 12a in and the bolt 12b out.

Figure 4:
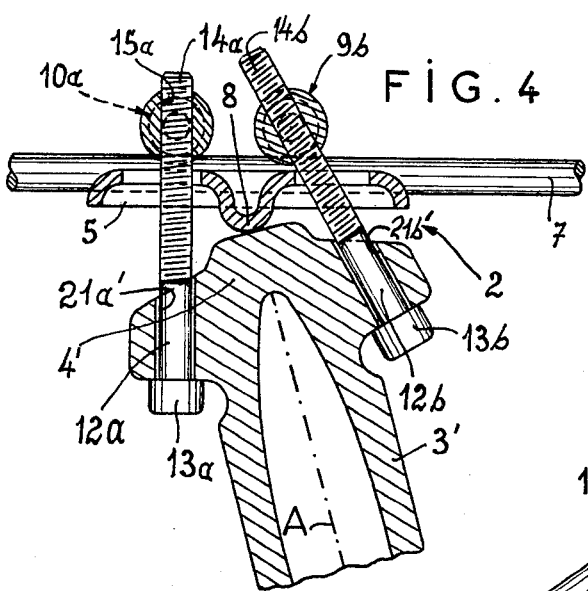
FIG. 4 is a longitudinal section through another assembly according to the invention.

The arrangement of FIG. 4 is identical with like structure bearing like reference numerals in FIGS. 1–3, except that the head 4' is formed as a body of revolution about the axis A of the tube 3', and has two diametrically opposed bores 21a' and 21b' which receive the bolts 12a and 12b, and which lie on an imaginary right cone centered on the axis A. Thus the two screws are inclined relative to each other, with the screw 12a being vertical.

Figure 5:
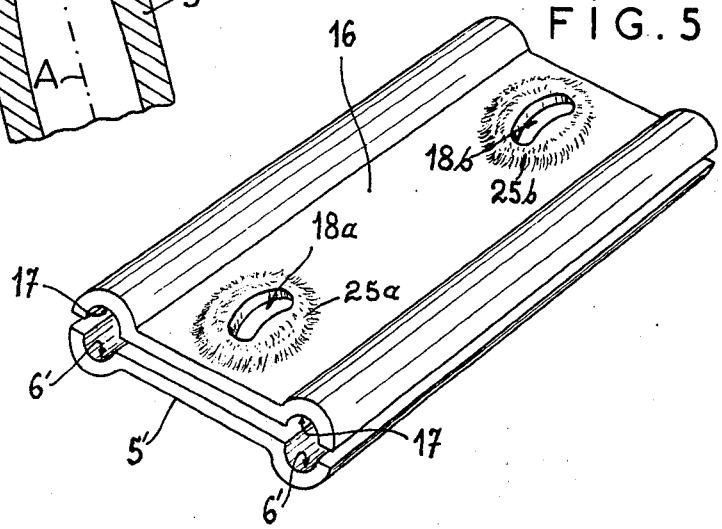
FIG. 5 is a perspective view of mounting and clamping plates according to this invention.
Figure 6:
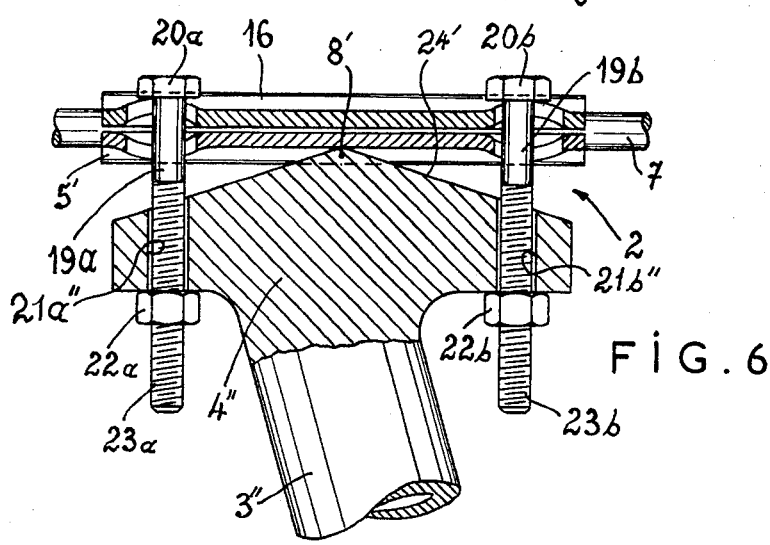
FIG. 6 is a longitudinal section through another assembly in accordance with the present invention using the plates of FIG. 5.

In FIGS. 5 and 6 plate 5' is essentially flat with two longitudinal grooves 6' forming seat halves for the rods 7 and an identical plate 16 overlies this plate 5' and acts as a clamping member. The tube 3" has a head 4" whose upper surface 24' is formed with a transverse boss or ridge 8' which engages the plate 5' between the grooves 6'. The plate 16 has grooves 17 identical to the grooves 6' and both plates 5' and 16 are formed with two longitudinally spaced holes 18a and 18b of longitudinally elongated shape and formed in rounded bosses 25a and 25b.

Bolts 19a and 19b pass through the holes 18a and 18b with their heads 20a and 20b lying on the bosses 25a and 25b of the upper plate 16 and their threaded shanks 23a and 23b passing through parallel longitudinally spaced holes 21a'' and 21b'' which flank the ridge 8'. Nuts 22a and 22b screwed on the shanks 23a and 23b lie against the underside of the head 4'' so that the saddle can be rocked by adjustment of these nuts 22a and 22b much as in FIGS. 1-4 with the bolts 12a and 12b.

Such an arrangement allows the bicycle or motorcycle saddle to be canted about a horizontal axis perpendicular to the normal direction of travel of the vehicle and locked in any position. Furthermore loosening of the clamping member or members allows the rods 7 to slide longitudinally for positioning the seat, and the tube 3 can be rotated about its own axis in its support tube so as to point the seat properly.

I claim:

1. A mounting assembly for securing a saddle having a pair of transversely spaced and longitudinally extending mounting rods to a support head with an upwardly directed support face, said assembly comprising:
 a plate formed with a pair of longitudinally extending and transversely spaced seats receiving said rods and having a face turned toward said support face;
 at least one securing member overlying said rods on said plate;
 a transverse boss forming an elongated rounded cross section ridge on one of said faces and resting against the other face, said other face being generally flat; and
 a pair of longitudinally spaced adjustment means flanking said boss and each including an adjustment element spanned between said member and said head for tilting said plate and said saddle relative to said head by shortening of one of said elements and lengthening of the other element.

2. The assembly defined in claim 1 wherein each of said adjustment elements is a bolt.

3. The assembly defined in claim 2, further comprising a second securing member, said members being cylindrical and formed with respective threaded bores each threadedly receiving a respective one at said bolts.

4. The assembly defined in claim 3 wherein each of said members is transversely elongated and is formed with a pair of spaced circumferential grooves each receiving a respective rod.

5. The assembly defined in claim 4 wherein said support head is formed with a pair of bores each receiving a respective bolt.

6. The assembly defined in claim 5 wherein said bores are parallel.

7. The assembly defined in claim 1 wherein said securing member is a plate formed with a pair of longitudinally extending and transversely spaced grooves receiving said rods and with a pair of longitudinally spaced holes between said grooves, said bolts passing through said holes of said member.

8. The assembly defined in claim 7 wherein said boss is formed on said support face of said head.

9. The assembly defined in claim 4 wherein said boss is formed on said support face of said head.

10. The assembly defined in claim 4 wherein said plate is formed with a pair of longitudinally spaced holes, said bolts passing through said holes.

* * * * *